(12) United States Patent
Hunter

(10) Patent No.: US 6,384,819 B1
(45) Date of Patent: May 7, 2002

(54) SYSTEM AND METHOD FOR GENERATING AN ANIMATABLE CHARACTER

(75) Inventor: Kevin L. Hunter, San Jose, CA (US)

(73) Assignee: Electric Planet, Inc., Palo Alto, CA (US)

( * ) Notice: Subject to any disclaimer, the term of this patent is extended or adjusted under 35 U.S.C. 154(b) by 0 days.

(21) Appl. No.: 09/173,583

(22) Filed: Oct. 15, 1998

Related U.S. Application Data
(60) Provisional application No. 60/062,361, filed on Oct. 15, 1997.

(51) Int. Cl.7 .............................................. G06T 17/00
(52) U.S. Cl. ...................................... 345/418; 345/473
(58) Field of Search ................................ 345/418, 471, 345/472, 473, 474, 441, 423, 428, 429, 430, 431, 432, 433

(56) References Cited

U.S. PATENT DOCUMENTS

| | | | |
|---|---|---|---|
| 4,737,921 A | 4/1988 | Goldwasser et al. | 364/518 |
| 4,843,568 A | 6/1989 | Krueger et al. | 364/518 |
| 5,267,154 A | 11/1993 | Takeuchi et al. | 364/419 |
| 5,434,617 A | 7/1995 | Bianchi | 348/170 |
| 5,663,809 A | 9/1997 | Miyaza et al. | 358/450 |
| 5,831,633 A | * 11/1998 | Van Roy | 345/441 |
| 5,831,875 A | 11/1998 | Hirata et al. | 364/578 |
| 5,850,228 A | * 12/1998 | Hasegawa et al. | 345/471 |
| 5,909,218 A | * 6/1999 | Naka et al. | 345/418 |
| 5,912,675 A | * 6/1999 | Laperriere | 345/473 |
| 5,920,319 A | * 7/1999 | Vining et al. | 345/420 |
| 5,933,150 A | * 8/1999 | Ngo et al. | 345/473 |

* cited by examiner

Primary Examiner—Cliff N. Vo
(74) Attorney, Agent, or Firm—Oppenheimer Wolff & Donnelly LLP

(57) ABSTRACT

A system and method are disclosed for generating an animatable object. A skeleton of the desired character is constructed by the user utilizing various predetermined components. These predetermined components include a various selection of rods and joints. The rods are static components which remain rigid during motion, while the various joints are moveable components. A static digitized image, for example, an image of the user, is utilized and a constructed skeleton is superimposed onto it. The desired object, such as the image of the user, can then be extracted from the background of the digital image and the resulting personal character can then be animated, for instance by selecting and dragging one of the hands with a mouse.

29 Claims, 10 Drawing Sheets

SYSTEM AND METHOD FOR GENERATING AN ANIMATABLE CHARACTER

CROSS REFERENCE TO RELATED APPLICATIONS

This application claims the benefit of U.S. Provisional Patent Application No. 60/062,361, filed on Oct. 15, 1997, entitled A SYSTEM AND METHOD FOR GENERATING AN ANIMATABLE CHARACTER by inventor Kevin L. Hunter, the disclosure of which is incorporated herein by reference for all purposes.

This application is related to co-pending U.S. pat. application Ser. No's. 08/951,089; 60/062,068; 08/951,087; and 08/951,083 all filed Oct. 15, 1997 respectively, are incorporated herein by reference for all purposes.

1. FIELD OF THE INVENTION

The present invention relates generally to a method and system for generating graphics in a computer system. More particularly, the present invention relates to generating an animatable object such that a user can generate and animate the object easily and effectively.

2. BACKGROUND OF THE INVENTION

With the explosive growth and popularity of computer games and Internet interaction, the use of images, especially images of objects such as animated characters, are becoming more prominent. Animated characters are commonly used in computer games to represent either the player or other various components of the game. Likewise, there are also numerous potential uses of an animatable character for use with Internet interaction. For example, an animated character could represent a user in a chat room on the Internet to provide more interactivity than conventional chat rooms. Another example is a community "room" where a character, used as a visual representation of a user, can roam and explore various parts of the community "room".

Typically, these objects, such as animatable characters, are laboriously created by a computer programmer through the use of codes which are typically too complex for the average user to utilize. Characters are often crafted by an artist and entered into a computer. Accordingly, these animatable objects and characters are typically predetermined and is normally not easily customized by the user. Additionally, conventional character generation and animation methods typically do not facilitate approximate real-time customized interaction with a predetermined environment or between two customized animatable characters. For instance, using conventional methods, it would be extremely difficult and expensive for each game player to use a customized animatable character in a real-time game. Conventional animation methods typically utilize a series of static images with very minor changes to simulate motion. Using this conventional technique, it would be extremely difficult and costly to generate a series of static images immediately after a motion command is received such that approximate real-time game playing is feasible. Alternatively, a predetermined sequence of motions can be pre-programmed. However, motions pre-programmed by a programmer are highly labor intensive and could severely limit motion and reaction by the animated object. Likewise, similar problems occur in Internet interaction between animatable characters under the control of users.

Accordingly, what is needed is a system and method for quickly and effectively generating a customized animatable character in a computer system. The present invention addresses such a need.

SUMMARY OF THE INVENTION

The present invention provides a system and method for generating an animatable object in a computer system. The generation of the animatable object is simple and effective enough to allow a user to generate a customized object such as an animatable character which resembles the user. Additionally, once the animatable object is generated, information regarding the generation of the object can be sent to another computer, for example, it can be transmitted through a network such as the Internet. Once the object has been generated at the receiving computer, only data regarding the motions of the generated object need be sent to the receiving computer in order to animate the object.

A skeleton of the desired character is constructed by the user utilizing various predetermined components. Alternatively, a generalized pre-constructed skeleton constructed from the predetermined components can be made available for the user. These predetermined components include a various selection of rods and joints. The rods are rigid components which remain rigid during motion, while the various joints are moveable components. A static digitized image, for example, an image of the user, is utilized and the constructed skeleton is superimposed onto it. The desired object, such as the image of the user, can then be extracted from the background of the digital image, superimposed onto the skeleton, and the resulting personal character can then be animated, for instance by selecting and dragging one of the hands with a mouse.

A system and method according to the present invention for generating an animatable object in a computer system comprises the steps of constructing a skeleton of a predetermined object; and superimposing the skeleton with a digital image, wherein the digital image includes the predetermined object.

BRIEF DESCRIPTION OF THE DRAWINGS

The invention, together with further objects and advantages thereof, may best be understood by referencing the following description taken in conjunction with the accompanying drawings in which.

DETAILED DESCRIPTION OF THE PREFERRED EMBODIMENTS

Reference will now be made in detail to a preferred embodiment of the invention. An example of the preferred embodiment is illustrated in the accompanying drawings. While the invention will be described in conjunction with a preferred embodiment, it will be understood that it is not intended to limit the invention to one preferred embodiment. To the contrary, it is intended to cover alternatives, modifications, and equivalents as may be included within the spirit and scope of the invention as defined by the appended claims.

The present invention employs various processes involving data stored in computer systems. These processes are those requiring physical manipulation of physical quantities.

Usually, though not necessarily, these quantities take the form of electrical or magnetic signals capable of being stored, transferred, combined, compared, and otherwise manipulated. It is sometimes convenient, principally for reasons of common usage, to refer to these signals as bits, values, elements, variables, characters, data structures, or the like. It should remembered, however, that all of these and similar terms are to be associated with the appropriate physical quantities and are merely convenient labels applied to these quantities.

Figure 1:
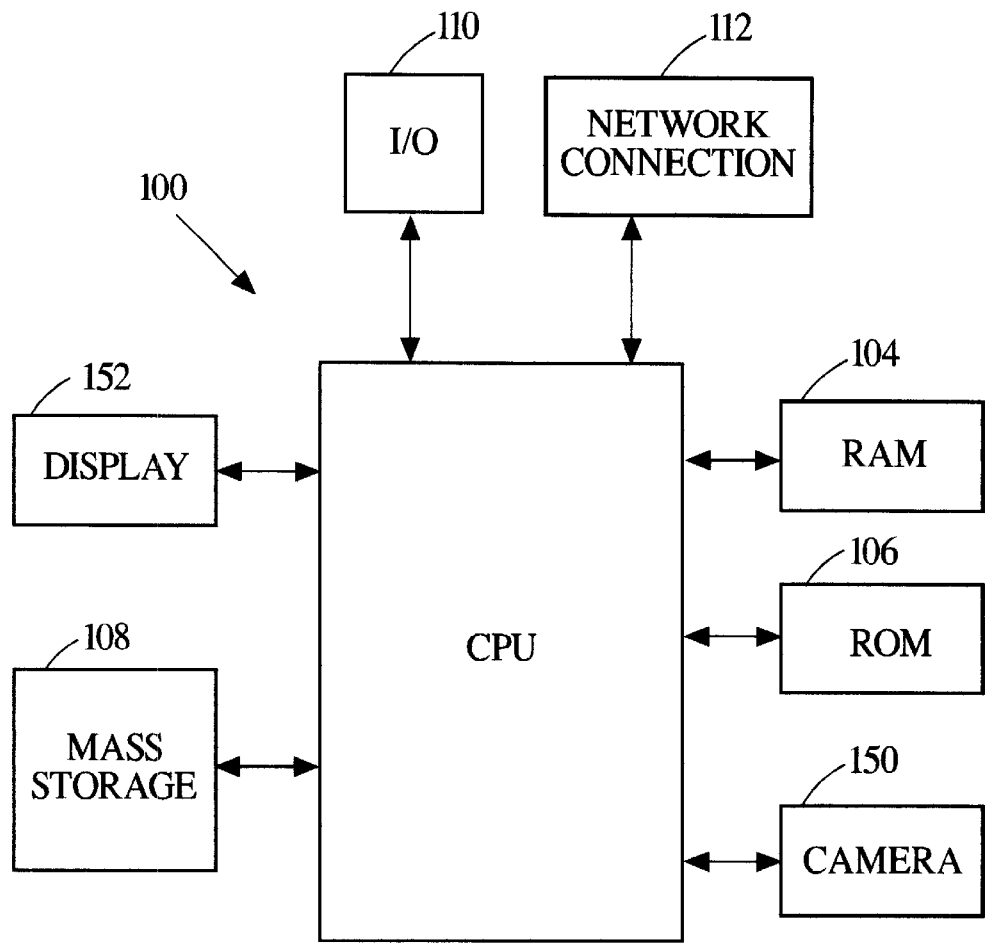
FIG. 1 is a schematic illustration of a general purpose computer system suitable for implementing the present invention.

FIG. 1 is a schematic illustration of a general purpose computer system suitable for implementing the process of the present invention. The computer system includes a central processing unit (CPU) 102, which CPU is coupled bi-directionally with random access memory (RAM) 104 and unidirectionally with read only memory (ROM) 106. Typically RAM 104 includes programming instructions and data, including text objects as described herein in addition to other data and instructions for processes currently operating on CPU 102. ROM 106 typically includes basic operating instructions, data and objects used by the computer to perform its functions. In addition, a mass storage device 108, such as a hard disk, CD ROM, magnetooptical (floptical) drive, tape drive or the like, is coupled bi-directionally with CPU 102. Mass storage device 108 generally includes additional programming instructions, data and text objects that typically are not in active use by the CPU, although the address space may be accessed by the CPU, e.g., for virtual memory or the like. The system is also shown to include a visual input device, such as a camera 150. Additionally, the CPU is also coupled to a display 152. Each of the above described computers further includes an input/output source 110 that typically includes input media such as a keyboard, pointer devices (e.g., a mouse or stylus) and the like. Each computer can also include a network connection 112 over which data, including, e.g., text objects, and instructions can be transferred. Additional mass storage devices (not shown) may also be connected to CPU 102 through network connection 112. It will be appreciated by those skilled in the art that the above described hardware and software elements are of standard design and construction.

Figure 2:
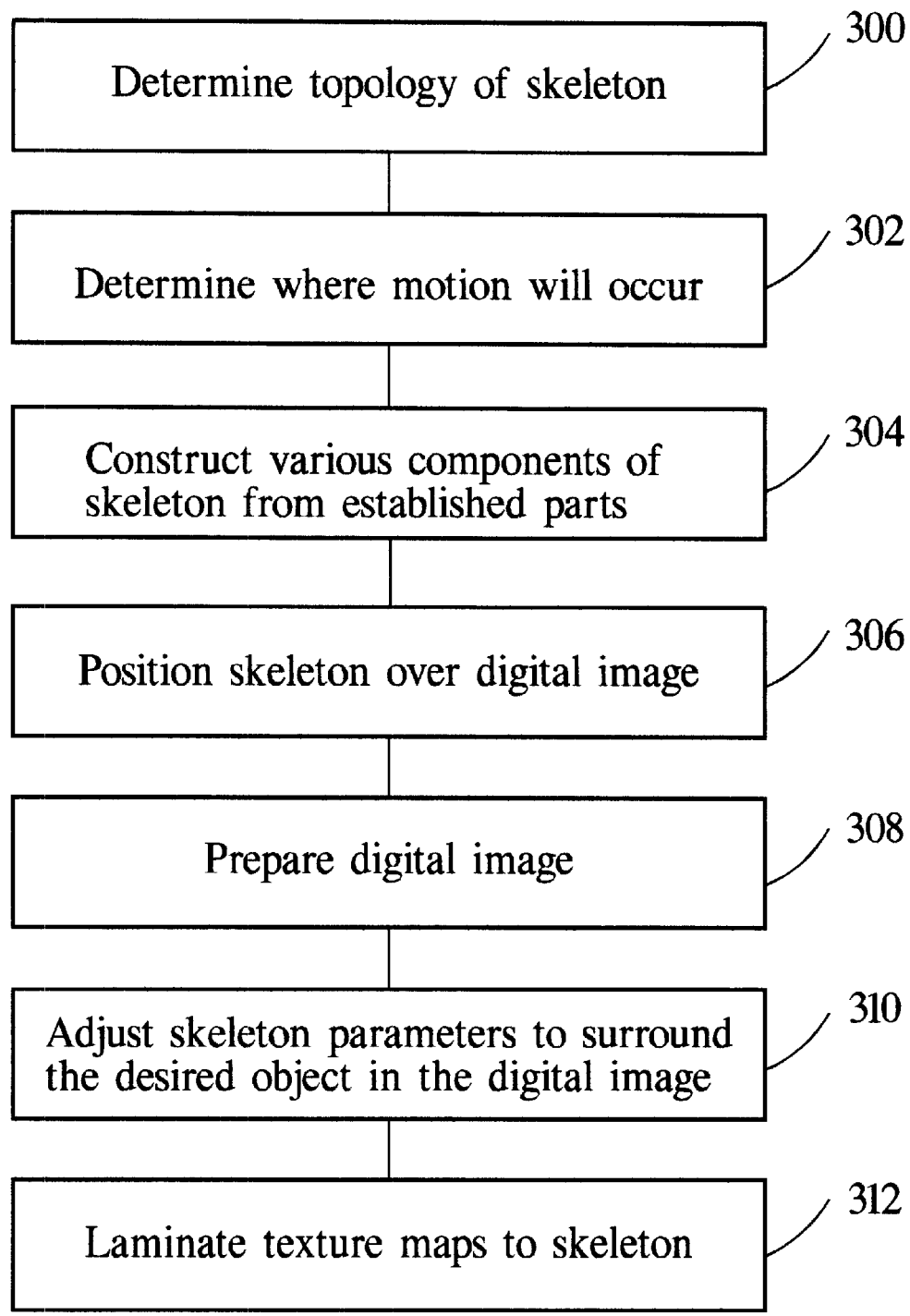
FIG. 2 is a flow diagram of a method for generating an animatable object according to the present invention.

FIG. 2 is a flow diagram of a method for generating a character according to the present invention. A character, as herein referred to, includes any object displayable on a display, such as a computer display. Preferably, the generated character is animatable. The term animatable is herein meant to include the display or presentation of a motion or a series of motions.

A topology of a skeleton is determined via step 300. A skeleton is herein referred to include any rough approximation of an object. For instance, a skeleton can include an outline of a person, or an object such as a chair. When the user determines the topology of a skeleton, the user can roughly estimate what shape the desired character will have. For example, the user can decide to create a personal character of himself. In doing so, the user determines that the topology of the skeleton will include a head portion, a body portion, two arm portions, and two leg portions.

It is then determined where motion will occur via step 302. In the given example, the user can determine that motion will occur at the shoulders, the elbows, the wrists, the waist, the hip joints, the knees, and the ankles.

Next, the user can construct various components of the skeleton from established parts via step 304. The established parts preferably include rods and joints, wherein the rods are sections which remain rigid during motion and the joints are movable sections. Preferably, the rods maintain their geometric parameters during motion.

The skeleton is then positioned over a digital image via step 306, and the digital image is prepared via step 308. The desired object in the digital image is preferably positioned such that joint angles are as close to zero as possible. For example, if the desired object is a person, it is preferred that the digital image of the person shows the person in a stance where the arms are separated from the body, such as parallel to the floor, and the legs spread apart.

Preparation of the digital image can include preparation such as background subtraction and real time capture of the image. Background subtraction is described in detail in co-pending U.S. Ser. No. 08/951,089 , filed Oct. 15, 1997, assigned to the same assignee as the present invention, herein incorporated by reference. Real time capture of the image is described in detail in U.S. Provisional Serial No. 60/062,068, filed Oct. 15, 1997, assigned to the same assignee as the present invention, also herein incorporated by reference. Alternatively, preparation of the digital image can be simplified through the use of a predefined background such as that described in detail in co-pending U.S. Ser. No. 08/951,087. Although these examples of the preparation processes are described in detail in the above identified co-pending U.S. applications, these processes will briefly be summarized herein.

The main objective of the preparation of the digital image via step 308 is to obtain a clean image of the desired object located within the digital image. This objective can be accomplished in one of several ways. For example, one way is to subtract the background and identify the desired object in its entirety. Background subtraction attempts to extract the desired object from the remaining portions of the digital image. One method of identifying the desired object is to take a photo of the background, then take another photo with the desired object located in front of the background. The first photo can be compared with the second photo and the new object identified. The background can then be automatically subtracted such that an approximate image of the desired object can be derived.

For a cleaner image of the desired object, the background subtraction method can be performed in conjunction with utilizing the skeleton as parameters for determining the background versus the desired object. If a portion of the image is within the parameters of the skeleton, then it can be considered as part of the desired object. If a portion of the image is outside the parameters of the skeleton, then it should be considered part of the background. For example, if a cat has inadvertently walked into the second photo, the cat would not be considered part of the desired object since the figure of the cat is not part of the skeleton.

Another way to subtract the background is by using a predefined background such as a box colored blue. When the desired object is placed in front of the predefined background, it is easier to determine what is the background and what is the desired object.

Yet another way to subtract the background is by manually extracting the desired object. The desired object can be manually extracted from the background by manually outlining the desired object from the background. In using the manually extraction method, the digital image is prepared prior to positioning the skeleton over the digital image. Accordingly, step 308 of FIG. 2 occurs prior to step 306. Using this manual method allows the desired object to be extracted from a single digital image.

Figure 3A:
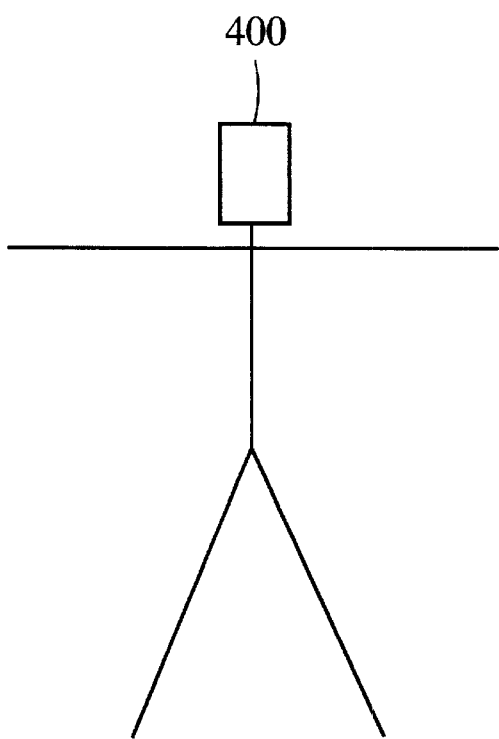
FIGS. 3A–3G illustrate the steps of the method according to the present invention as shown in FIG. 2.
Figure 3B:
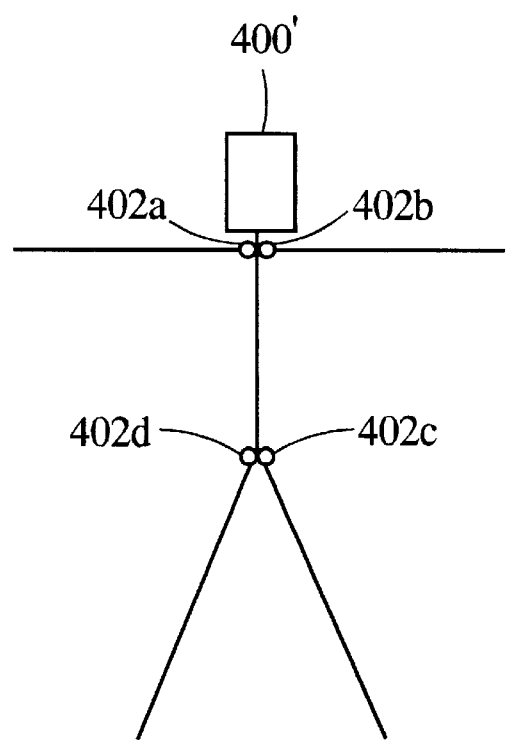

The parameters of the skeleton are then adjusted to surround the entire desired object in the digital image via step 310. Texture maps are then laminated onto the skeleton via step 312 using well-known texture mapping techniques. The appearance of the joints is likely to improve if the skeleton is adjusted tightly around the desired object. Moreover, in general, the texture maps will require less storage space if the skeleton is adjusted tightly around the desired object. FIGS. 3A–3G illustrate step 300–312 of the method described in FIG. 2. The topology of the skeleton is determined as shown in FIG. 3A. The locations where motion will occur is then determined as shown in FIG. 3B. In this example, a skeleton 400 of a person is shown in FIGS. 3A and 3B. FIG. 3B also shows some of the locations where motion will occur at points 402A–402D.

Figure 3C:
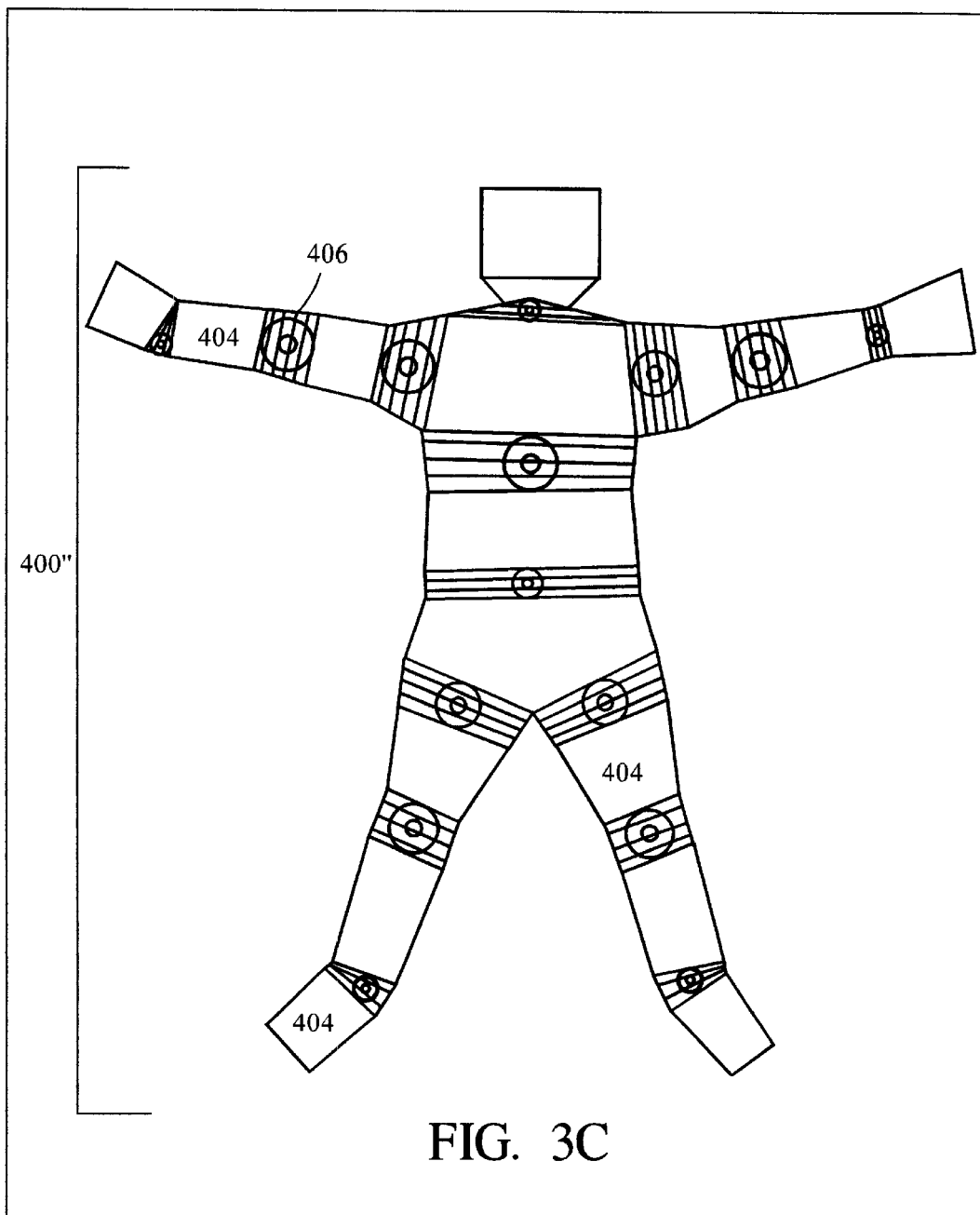

FIG. 3C shows an example of a skeleton 400" which is constructed from established parts. These established parts include rods 404 and joints 406. When a component of the skeleton 400" is moved, the rods 404 remain rigid while the joints 406 can flex and/or rotate. Note that the parameters and dimensions of the rods and joints can be changed, for example, elongated, shrunk, or angled. However, during motion of a particular component, the dimensions of the rods remain fixed. Joints 406 which can be used for the skeleton are described in detail in co-pending U.S. application Ser. No. 08/951,083, filed Oct. 15, 1997, assigned to the same assignee as the present invention, as herein incorporated by reference. For ease of reference, a brief description of examples of joints which can be used on the skeleton is included herein.

Various joint designs may be used to accomplish the end result of substantial structural integrity of the rods during and immediately after movement. Two examples of joints which can be used are what is herein referred to as center pin joints, and center radial joints. Either of the exemplary joints can be made from various geometric shapes. Preferably, they are a compilation of polygons. For example, these joints can be created out of two or more rectangles, trapezoids, or triangles.

The center pin joint is a non-segmented joint. A non-segmented joint is herein meant to describe a joint which consists of approximately two polygons. The center pin joint can be imagined as taking two abutting rectangles and sticking a pin through the center of the common edge. Both halves of the joint experience no substantial distortion as the joint angle is varied. However, the center pin joint may be discontinuous in some way when one portion of the joint is being rotated. For example, when a lower arm of a character is moved, a triangular gap may appear between the upper arm and the lower arm.

The center radial joint is a segmented joint. Segmented joints have the properties that they appear to retain texture map continuity when the joint is rotated, however, the interiors of the segments will be warped in some manner. For example, when a lower arm of the character is moved, no gap will appear between the upper arm and the lower arm since the segments of the segmented joint will warp to cover that section. Segmented joints can consist of two or more geometric shapes such as polygons.

Figure 3D:
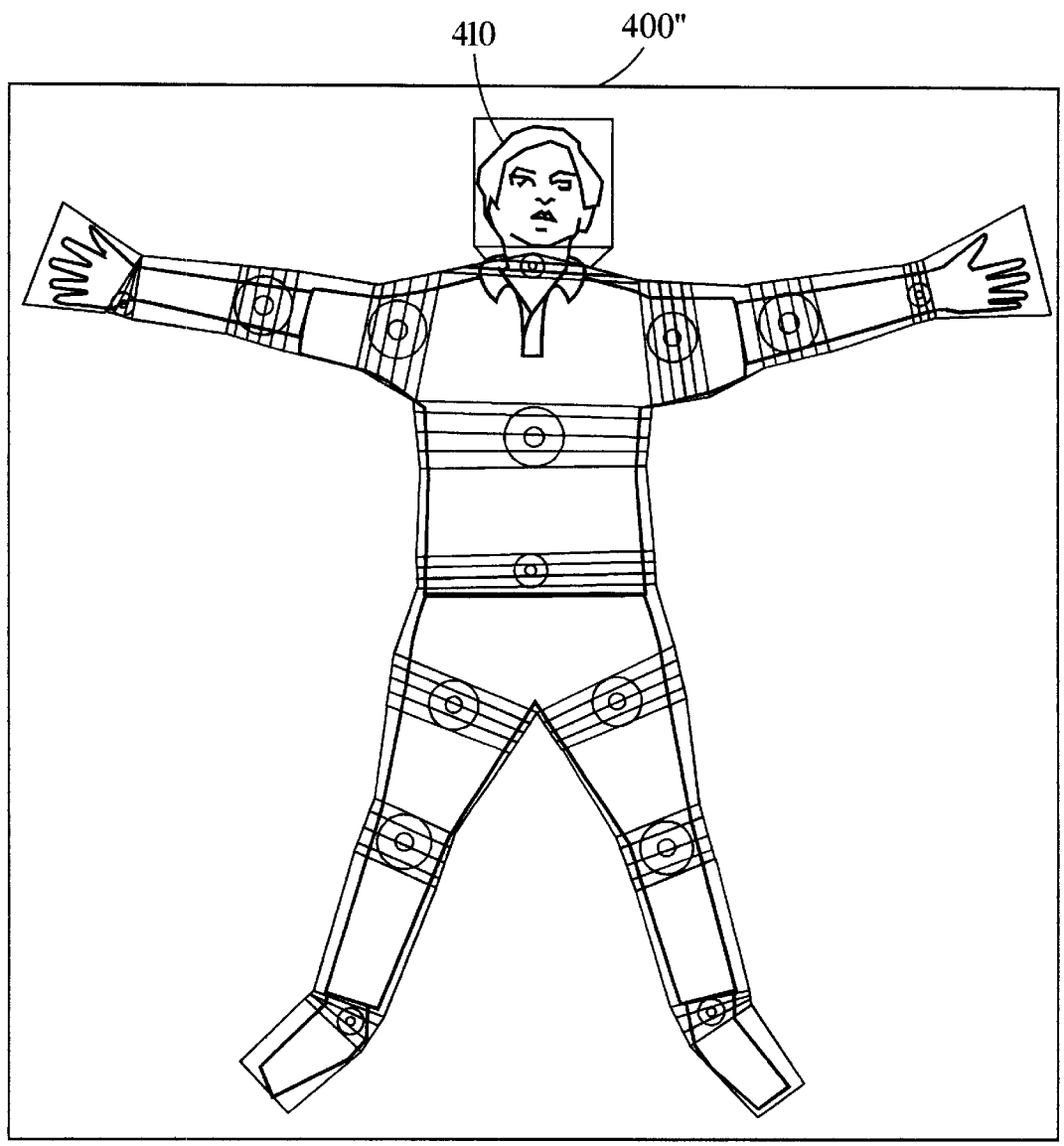

FIG. 3D illustrates the skeleton 400" being overlaid with the desired object of a prepared digital image, in this case, a person 410, to create a customized character.

Figure 3E:
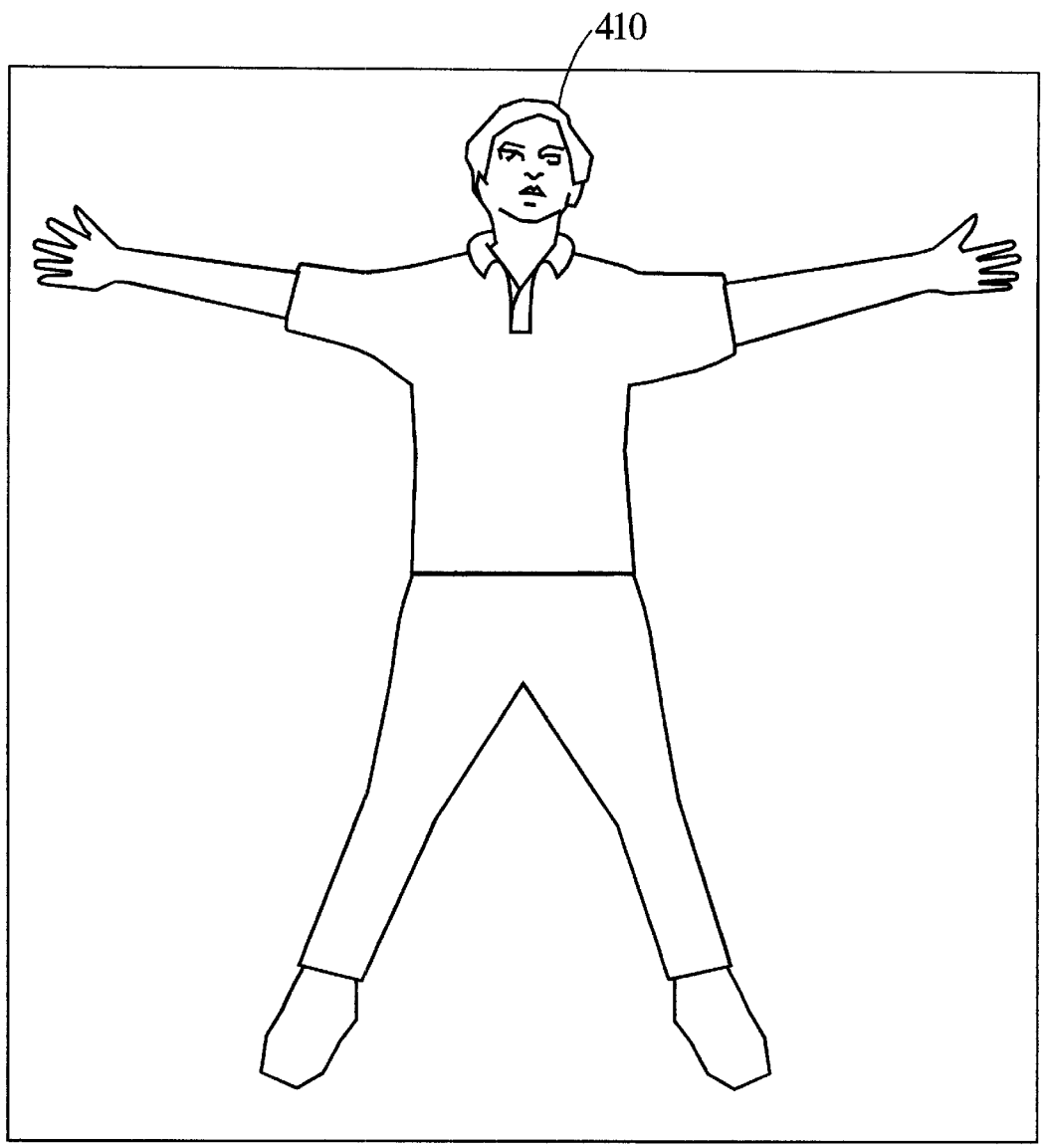

FIG. 3E shows the desired object, in this case a person, after the digital image has been prepared via step 308 of FIG. 2. The background has been subtracted and the desired object 410 is clearly defined. As previously mentioned, details of examples of methods for the preparation of the digital image are discussed in co-pending applications which are herein incorporated by reference. As previously stated, a clean image of the desired object can be obtained by several ways. One method is for a person to follow the outlines of the desired object, thereby "cutting out" the desired object and "pasting" the desired object onto the skeleton. Another method is to photograph the background image without the desired object, then photograph the desired object in front of the background and perform a background subtraction based on subtracting the first image from the second image. Additionally, to obtain a cleaner image than what the background subtraction can provide, the background subtraction can be performed in conjunction with the parameters of the skeleton such that anything outside the skeleton will be subtracted as background and portions inside the skeleton can be determined as part of the desired object. This preparation method can avoid situations such as dark spots within the center of the desired object or additional objects aside from the desired object being included as part of the desired object.

Figure 3F:
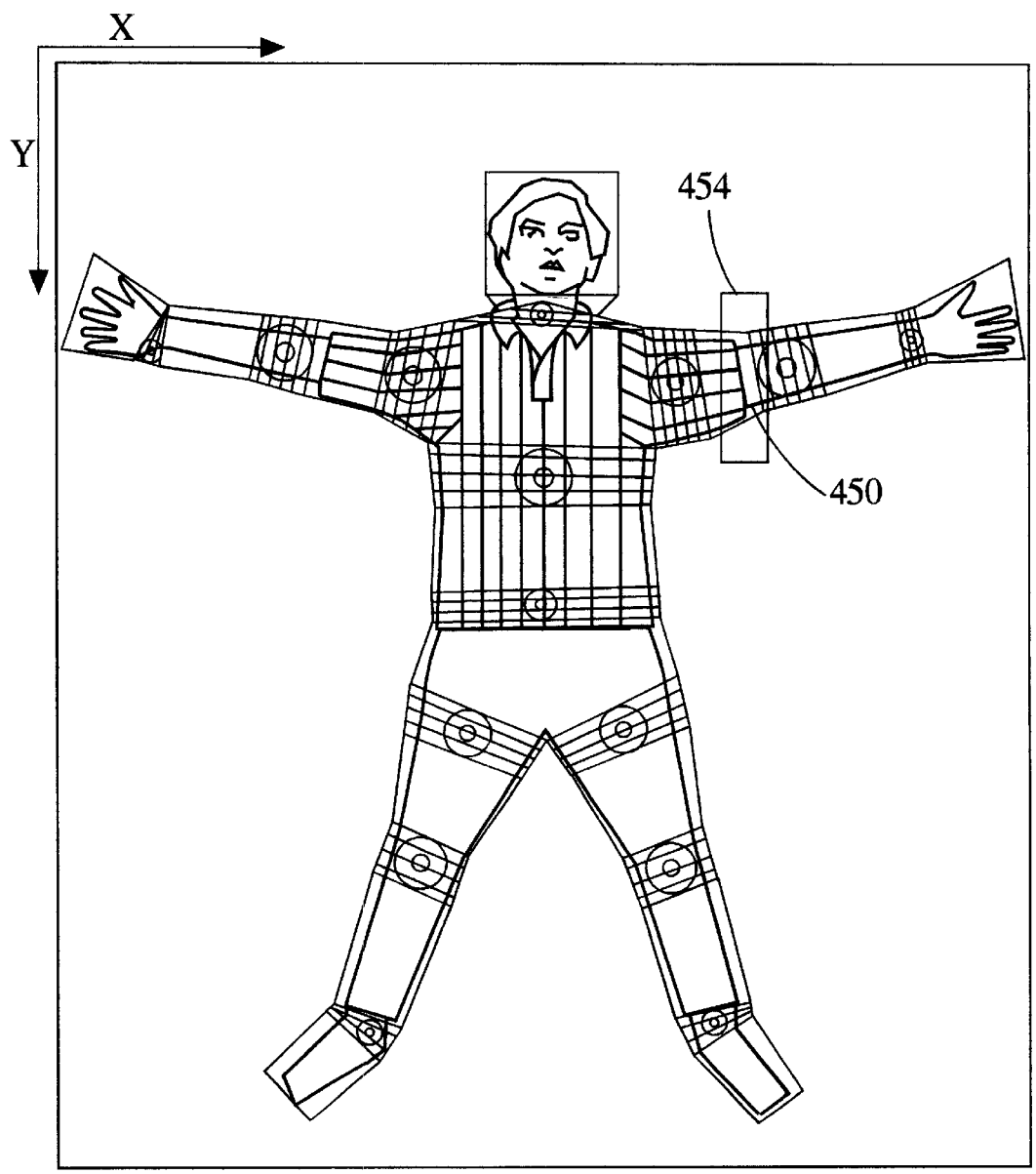
Figure 3G:
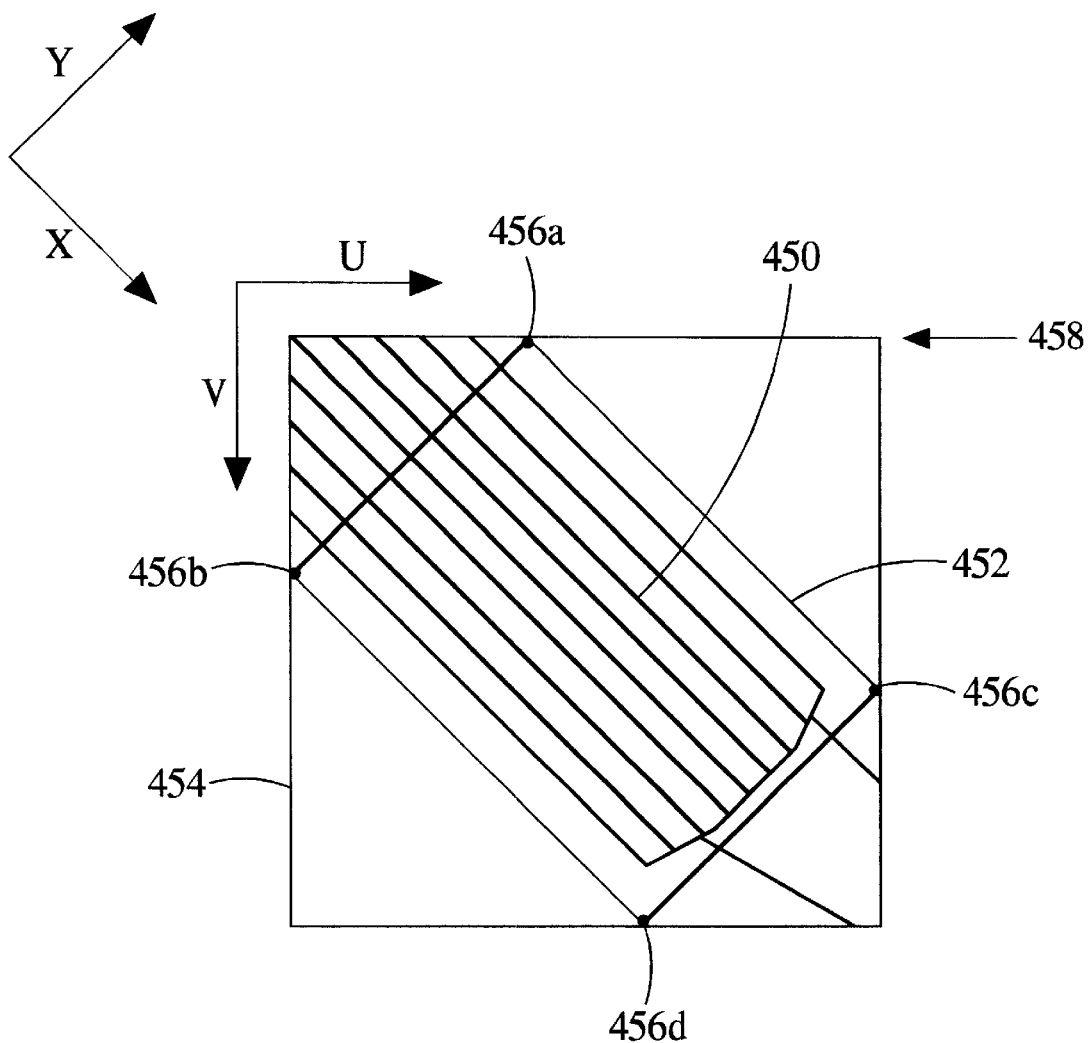

FIGS. 3F and 3G illustrate the texture mapping step 312 of FIG. 2. Texture mapping is well known in the field of art. For example, basic principles of texture mapping can be found in *Advanced Animation & Rendering Techniques*, Chapter 6, "Mapping Technique: Texture & Environmental Mapping", Alan Watt, Mark Watt, Addison Wesley (1992). Laminating the texture map onto the skeleton allows consistency in the texture of a component of the desired object when that component is moved. For example, when an arm is moved from a vertical position to a horizontal position, the stripes on the sleeve of the arm will also appear to move from the vertical position to the horizontal position. Texture mapping for purposes of the present invention can be performed in various ways, including affine mapping, perspective mapping, and bilinear mapping.

In the example shown in FIGS. 3F and 3G, a texture map area 454 is associated with a portion of the character as shown in FIG. 3F. The portion associated with the texture map area 454 is shown as an arm 450, which also includes a portion of a sleeve with stripes on it. The pixels included in the area associated with the texture map area 454 are copied and transformed from an (x,y) coordinate associated with the pixels to a (u,v) coordinate associated with the texture map area 454. The transformed, copied pixels are typically referred to as texels.

FIG. 3G shows the texture map area 454 including texels. A region 452 is associated with the texture map area 454. The texture map area 454 includes all the pixels within the area, which are typically referred to as texels. The texture map area 454 typically includes representative points, in this example, the vertices 456a–456d. Data related to these vertices 456a–456d include (x,y) coordinates related to the display and they also include (u,v) coordinates related to the texture mapping area 454. The (u,v) coordinates of the vertices 456a–456d can be derived through various methods. One method of deriving the (u,v) coordinates is described below.

The (u,v) coordinates range from 0 to 1. The u and v coordinates can be derived as ratios to the height and width of the bounding texture map area 454. For instance, if the top boundary 458 of the texture mapping area 454 is one hundred texels wide and if the vertex 456a is at the twenty-fifth texel counting from the upper left corner of the texture mapping area 454, then the vertices 456a will have a (u,v) coordinate of (0,0.25). ($25/100=0.25$) The (u,v) coordinate does not change regardless of how the character is moved within the display. Thus, the vertices 456a–456d can have their (x,y) coordinates changed without affecting their (u,v)

coordinates. When the texels are scanned, the (u,v) coordinate of the non-vertices texels are interpolated, such that only the (u,v) coordinates of the vertices 456a–456d need be stored. Additionally, only the image included in the region 452 will be scanned out, such that the remaining portions of the character outside the region 452, but within the texture map area 454 will not be addressed. Accordingly, the texture appears consistent with the rest of the shirt when a portion of the shirt is moved.

Figure 4:
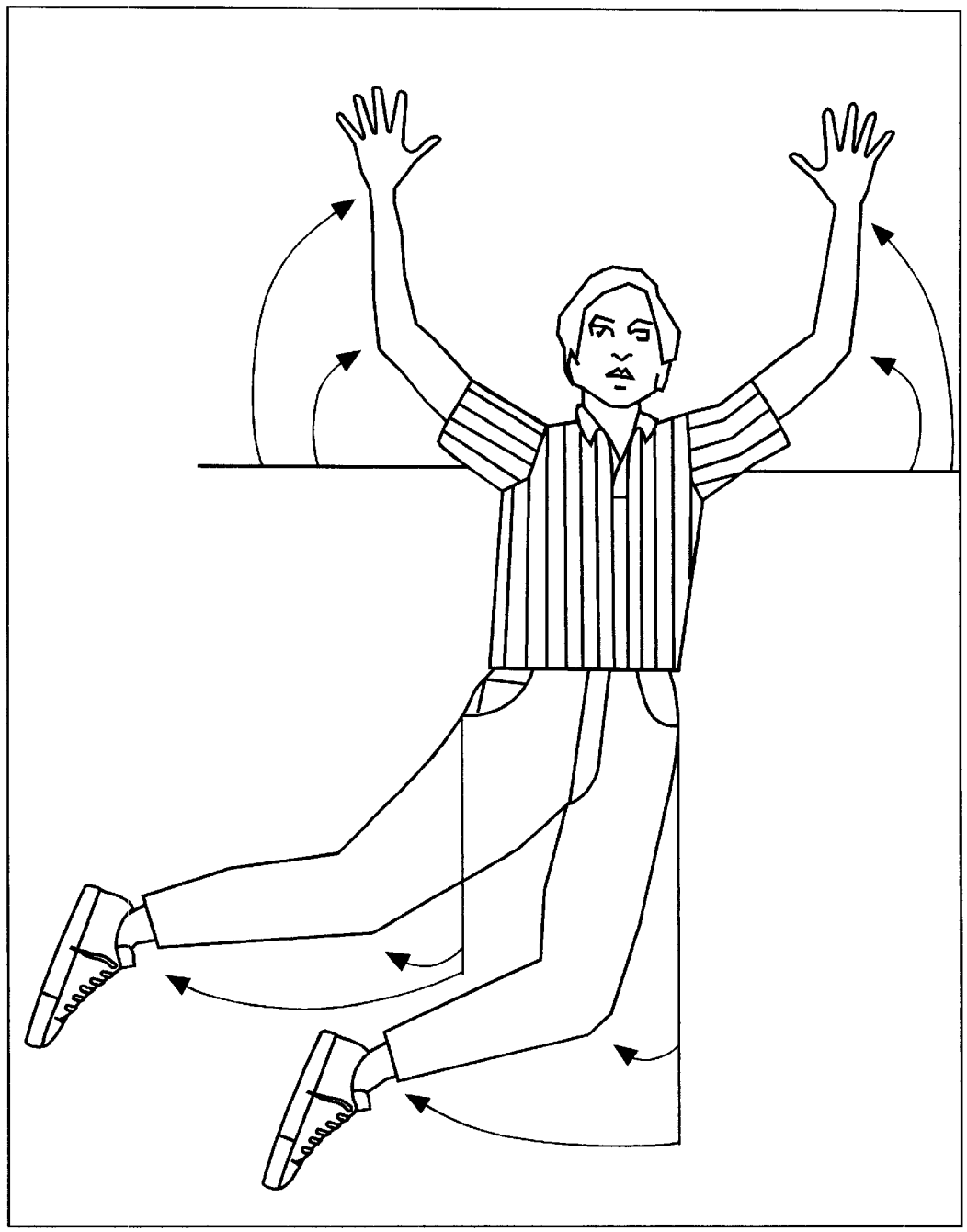
FIG. 4 is an illustration of the generated animatable object after portions of it have been moved.

FIG. 4 shows the resulting customized character with portions of the character having been moved. Despite the fact that the customized character is initially created in a static pose, it is animatable after it is created. For instance, although it is preferred that the desired object, such as a child, poses in a single pose, preferably arms out and legs apart, this digitized image can be animated once the customized character of the child is created. In FIG. 4, the arms have been rotated upward while the legs have been rotated in a clockwise direction. Thus the customized character can be animated in whatever manner the user chooses.

Note that one of the advantages of the present invention is that a user can create a customized character quickly and efficiently without the need for programming in code and without a highly labor intensive session. The user can "click and drag" a portion of the customized character, such as the arm, into a new position. Additionally, parameters and dimensions can be changed, for instance, the length of the legs can be changed and the waist of the customized character can be cinched. Thus, once the customized character is created, the parameter of the skeleton can be changed and the desired object from the digital image changes along with the skeleton. The user may simply "click and drag" certain points of the customized character such that the user can change the parameters of the torso by clicking on a point in the waste of the character dragging it closer in, thereby cinching the waste.

The customized characters can be the image of a person or an inanimate object such as a teddy bear or a chair, or an imaginary character. These customized characters can be used in various ways, for example, they can be animated, used as a personal representation of the user, or used in a computer game. Because the customized character can have many degrees of freedom allowed by a large number of parameters, almost any type of animation is possible. Once the customized character is created, it is a coherent connected geometric model in which portions of the customized character can be moved in conjunction with the rest of the rest of the customized character rather than as a compilation of independent parts. Automatic animation can also be performed via a game or animation package. For animation of expression, for example on a person's face, a continual capture of the person's face can be used to paste onto the face of the customized character.

Once created, the customized character can be stored in memory, perhaps in a file format. The customized character is a displayable primitive which can be recalled onto a display whenever the user prefers. The customized character is an editable construct wherein the form of the character can be changed to a user's preferences. For example, joint angles can be changed, motions can be made, and the customized character can be programmed to dance. Each component of the customized character, such as rods and joints, can be considered an object in an appropriate programming language, such as C++. Accordingly, commands may be sent to a body part to detach itself from the remaining body, or a body part can be referenced by name and a command directed specifically to that particular body part.

Because the skeleton of the customized character is a coherent geometric model, either forward kinematics or inverse kinematics can be used to ensure that when a portion of the customized character is moved, other portions connected to it will behave according to a predetermined model of motion. An example of forward kinematics is when the joints of an arm of a customized character is moved, the hand attached to the arm will move accordingly. An example of inverse kinematics is when a hand is moved, the joints in the arm are consistent with the hand motion such that the rest of the arm will move appropriately to adjust to the new position of the hand. The principles and applications of inverse kinematics is well known in the field of art.

A further advantage of the method and system according to the present invention is the ability to transmit the data relating to the customized character over a network, such as the Internet. Once the data related to the generation of the customized character has been transmitted, it is not necessary to continually retransmit the generation data. Rather, the data related to the generation of the customized character need only be transmitted and properly received once. To create animation, once the receiver has received the data regarding the generation of the customized character, only data related to the animation would need to be sent. For example, once the customized character has been received by the receiver, the sender would merely need to send information such as joint angles, position of body, possible rotation of body, changes in length, and possibly changes in width. Accordingly, only changes to the customized character would need to be sent rather than re-sending the customized character in various animated forms such as would be necessary in a continuous stream of video.

Sending a continuous stream of video would be highly inefficient and costly. In contrast, according to the method and system of the present invention, after the initial cost of sending data related to the creation of the customized character, the customized character would not need to be recreated in a different stance, rather only the changes to the customized character would need to be sent. Merely sending the changes would normally constitute such a small amount of data that two players on a network such as the Internet could play a game together in appropriate real time with customized characters representing themselves with each game player sending data regarding the changes to their own customized character to the other computer on the Internet.

Figure 5:
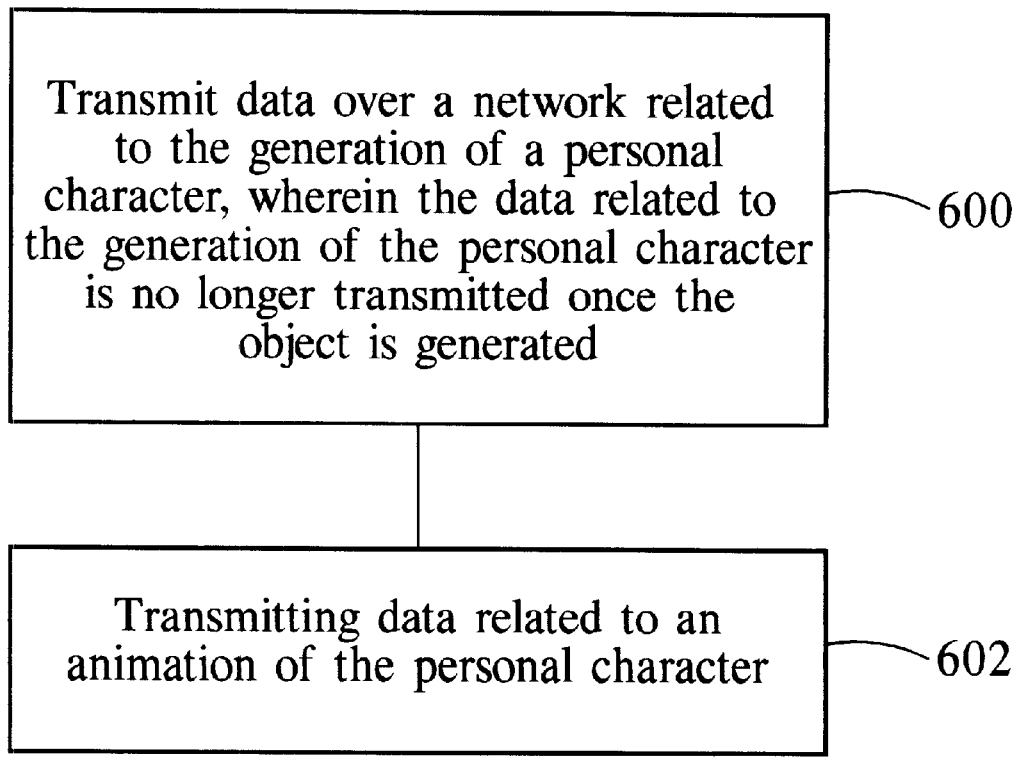
FIG. 5 is a flow diagram of a method according to the present invention for utilizing the generated animatable object.

FIG. 5 shows a basic flow diagram of a method according to the present invention for animating a customized character in a computer network system. Data related to the generation of a customized character is transmitted over a network via step 600, wherein the data related to the generation of the personal character no longer needed to be transmitted once the object is generated. Thus, unlike a stream of video, or an image which needs to be refreshed regularly, once the data regarding the generation of the customized character is received, no further data related to the generation of the same customized character is required. Then, data related to an animation, or a change in any portion of the customized character is transmitted via step 602. Accordingly, only the changes, such as changes in a particular joint angle, need to be transmitted through the network from that time forward.

A method and system for generating an animatable character has been disclosed. Software written according to the present invention is to be stored in some form of computer-readable medium, such as memory or CD-ROM, or transmitted over a network, and executed by a processor.

While this invention has been described in terms of preferred embodiments, it is contemplated that alternations, modifications, and permutations thereof will become apparent to those skilled in the art upon the reading of the specification and study of the drawing. Furthermore, certain terminology has been used for the purposes of descriptive clarity, and not to limit the present invention. It is therefore intended that the following appended claims include all such alternations, modification, and permutations as fall within the true spirit and scope of the present invention.

What is claimed is:

1. A method for generating a character in a computer system comprising:

constructing a skeleton of a predetermined object; and superimposing the skeleton with a digital image wherein the digital image includes the predetermined object.

2. The method of claim 1, wherein the skeleton is constructed of at least one predetermined component.

3. The method of claim 2, wherein the predetermined component is a rod.

4. The method of claim 2, wherein the predetermined component is a joint.

5. The method of claim 1, further comprising a step of laminating a texture map to the skeleton.

6. The method of claim 1, further comprising a step of adjusting a skeleton parameter to correspond with the desired object.

7. The method of claim 6, wherein the step of adjusting includes adjusting the skeleton parameter to approximate a parameter of the desired object.

8. The method of claim 1, further comprising a step of determining a topology of the skeleton.

9. The method of claim 1, further comprising a step of determining where a motion will occur.

10. The method of claim 1, wherein the personalized character can be animated.

11. A method for animating an object in a computer system comprising:

transmitting data related to a generation of the object, wherein the data related to the generation of the object is no longer transmitted once the object is generated; and transmitting data related to an animation of the object.

12. The method of claim 11, wherein the steps of transmitting occur via a network.

13. The method of claim 11, wherein the steps of transmitting occur via an Internet.

14. A system for generating a character in a computer system comprising:

means for constructing a skeleton of a predetermined object; and means for superimposing the skeleton with a digital image wherein the digital image includes the predetermined object.

15. The system of claim 14, wherein the skeleton is constructed of at least one predetermined component.

16. The system of claim 15, wherein the predetermined component is a rod.

17. The system of claim 15, wherein the predetermined component is a joint.

18. The system of claim 14, further comprising a means for laminating a texture map to the skeleton.

19. The system of claim 14, further comprising a means for adjusting a skeleton parameter to correspond with the desired object.

20. The system of claim 14, wherein the personalized character can be animated.

21. A system for animating an object in a computer system comprising:

means for transmitting data related to a generation of the object, wherein the data related to the generation of the object is no longer transmitted once the object is generated; and means for transmitting data related to an animation of the object.

22. The system of claim 21, wherein transmitting the data occurs via a network.

23. The system of claim 21, wherein transmitting the data occurs via an Internet.

24. A method for compressing video data comprising:

developing an initial representation from an initial image of a known object;

comparing a current image of said known object with said initial representation; and developing a description of a position change of said known object between said current image and said initial representation.

25. A method as recited in claim 24 wherein said initial representation is a skeleton representation.

26. A method as recited in claim 25 wherein said description includes a description at least one of a rod and a joint position.

27. A method as recited in claim 25 wherein description includes a description of said at least one of a rod and a joint position is a relative position.

28. A method as recited in claim 25 wherein said description includes a description of at least one of a rod and a joint position is an absolute position.

29. A method as recited in claim 24 wherein said description is transmitted over a network.

* * * * *